Figure 1:
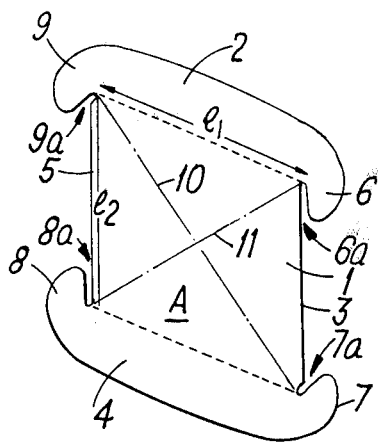

United States Patent [19]

Strom

[11] 3,895,229

[45] July 15, 1975

[54] HOLLOW SHELL-LIKE BODIES AND ELEMENT FOR USE IN CONSTRUCTION OF SAME

[76] Inventor: Holger Strom, Tower Rd., Jenkinstown, County Kilkenny, Ireland

[22] Filed: Nov. 13, 1973

[21] Appl. No.: 415,412

[30] Foreign Application Priority Data
Nov. 14, 1972 Ireland................................ 1564/72

[52] U.S. Cl........................ 240/108 B; 35/72; 46/1; D48/16; 240/108 R; 428/33; 428/80
[51] Int. Cl.............................................. A44c 21/00
[58] Field of Search....... 161/7; 240/108 R; D48/16; 35/72; 46/1, 23

[56] References Cited
UNITED STATES PATENTS

| | | | |
|---|---|---|---|
| 1,292,188 | 1/1919 | Wheeler................................ | 35/72 |
| 3,451,881 | 6/1969 | Gurule................................... | 161/7 |
| 3,666,607 | 5/1972 | Weissman.............................. | 161/7 |
| 3,736,418 | 5/1973 | Havlova........................... | 240/108 R |

*Primary Examiner*—William E. Schulz
*Attorney, Agent, or Firm*—Young & Thompson

[57] ABSTRACT

The invention relates to flexible sheet elements for use in the construction of hollow shell-like bodies such as lampshades. Each element is of quadrilateral shape and is formed with a hook at each corner so that it can be interconnected with adjacent elements to form the body.

8 Claims, 16 Drawing Figures

PATENTED JUL 15 1975

3,895,229

SHEET 1

PATENTED JUL 15 1975                    3,895,229

SHEET  2

HOLLOW SHELL-LIKE BODIES AND ELEMENT FOR USE IN CONSTRUCTION OF SAME

SUMMARY OF THE INVENTION

The invention relates to elements for use in the construction of hollow shell-like bodies which are particularly suitable for use as lampshades or decorative objects.

According to the invention an element for use in the construction of hollow shell-like bodies comprises a sheet of flexible material having at least four corners and having four laterally extended portions which are shaped to define hooks each of which hooks is located at a corner of the sheet with the mouths of two of said hooks facing towards the mouths of the other two hooks, and the hooks being shaped to interlock with the hooks of similar elements in the construction of a hollow body. In a preferred embodiment the sheet has four sides and two opposite sides are extended at their ends to provide the laterally extended portions and said two opposite extended sides are joined by two unextended sides. Preferably, the effective lenght of one of the extended sides is greater than that of an adjoining unextended side and the effective length of the other extended side is greater than that of the other adjoining unextended side.

By "effective length" of a side is meant the length measured from the deepest part of the mouth of a hook at one corner of the sheet to the deepest part of the mouth of a hook at an adjacent corner of the sheet. In a preferred embodiment of the invention the effective lengths define a parallelogram.

In a further embodiment the element has at least three corners and has two laterally extended portions shaped to define hooks each of which hooks is located at a corner of the sheet with the mouths of the two hooks facing each other, and a third hook is provided at a third corner of the sheet.

The invention also includes lampshades and decorative objects constructed from a plurality of elements according to the invention.

IN THE DRAWINGS

Figure 2:
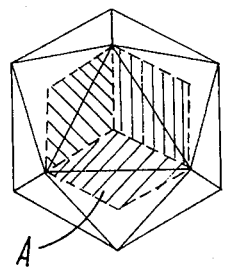
Figure 3:
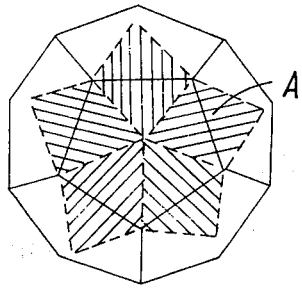
Figure 4:
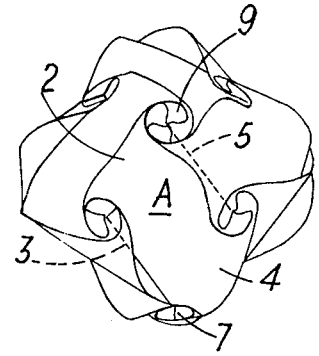
Figure 5:
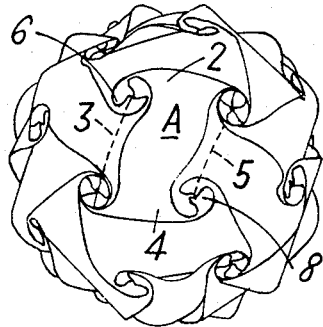
Figure 6:
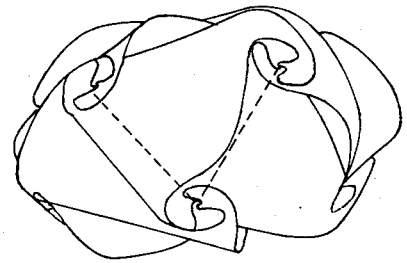
Figure 7:
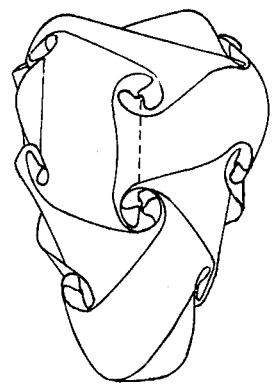
Figure 8:
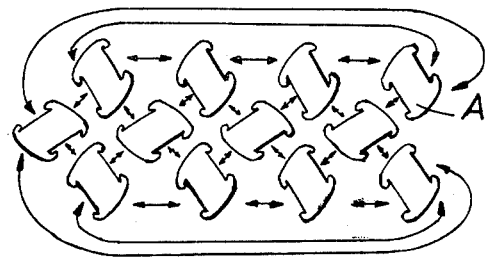
Figure 9:
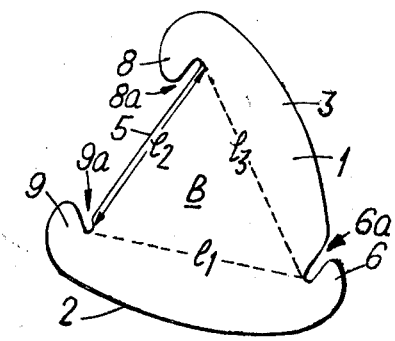
Figure 10:
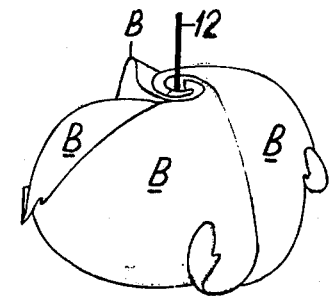
Figure 11:
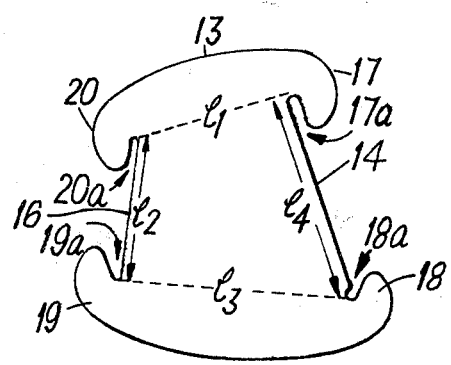
Figure 12:
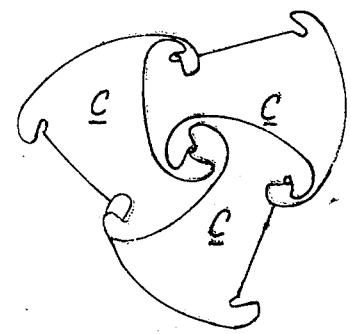
Figure 13:
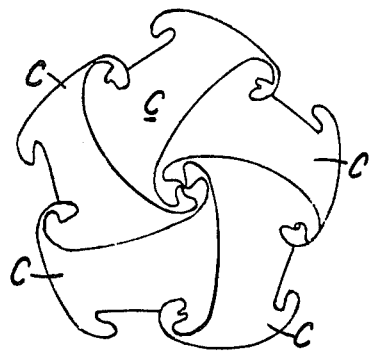
Figure 14:
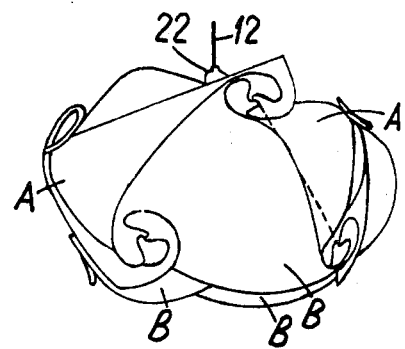
Figure 15:
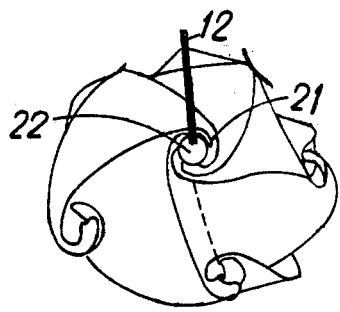
Figure 16:
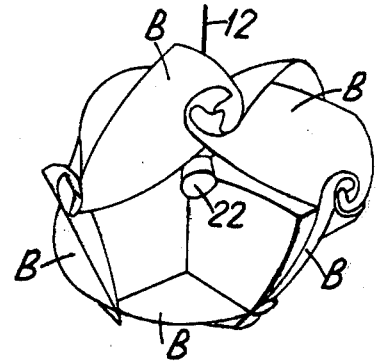

FIG. 1 is a plan view of a first element of the invention,

FIGS. 2 and 3 are diagrammatic illustrations of two methods of assembly of the elements of the invention in the construction of a hollow body, FIG. 4 is a perspective view of a hollow body formed from twelve interconnected elements of the invention arranged to the general pattern of a rhombic dodecahedron, FIG. 5 is a perspective view of a hollow body formed from thirty interconnected elements of the invention arranged to the general pattern of a rhombic triacontahedron, FIGS. 6 and 7 are perspective views of irregular shaped hollow bodies formed from a plurality of interconnected elements of the invention, FIG. 8 is a diagrammatic illustration of one arrangement of the elements of the invention prior to their assembly to form a hollow body, FIG. 9 is a plan view of a triangular element, FIG. 10 is a perspective view of a lampshade constructed from four of the elements shown in FIG. 9, FIG. 11 is a plan view of a second rectilinear element of the invention, FIG. 12 is a plan view of three of the elements of FIG. 11 interconnected in a triangular configuration, FIG. 13 is a plan view of five of the elements of FIG. 11 interconnected in the configuration of a pentagon, FIG. 14 is a perspective view from the side of a lampshade constructed from a combination of the elements shown in FIGS. 1 and 11, FIG. 15 is a perspective view from above of the lampshade shown in FIG. 14, and FIG. 16 is a perspective view from below of the lampshade shown in FIG. 15.

Referring to FIG. 1 an element A of the invention consists of a sheet 1, which is normally flat but which is capable of flexure and curvature. A sheet of a translucent plastics material has been found to be suitable. The sheet is bounded by four sides, 2,3,4 and 5. Opposite sides 2 and 4 are laterally extended and curved to define hook members 6,7,8 and 9, each of which is located at a respective corner of the sheet. The mouths of the hook members are indicated by the reference numerals 6$l$,7$a$,8$a$, and 9$a$, respectively. It will be noted from FIG. 1 that the hook mouths 6$a$ and 9$a$ face towards hook mouths 7$a$ and 8$a$, respectively. The mouths 6$a$ and 8$a$ of the diagonally opposite hook members 6 and 8; respectively, have their longitudinal axes running substantially parallel to the sides 3 and 5, respectively whereas the mouths 7$a$ and 9$a$ are inset into the main part of the sheet so that their longitudinal axes are inclined to the sides 3 and 5. The purpose of providing the hooks 7 and 9 with inturned mouths will be described hereinafter. The effective length of the sides, that is the length which is critical for assembly purposes, is obtained by measuring between the deepest points of adjacent hook mouths. Thus the effective length of the sides 2 and 4 is the length between the deepest points of hook mouths 6$a$ and 9$a$, and 7$a$ and 8$a$, respectively. In the embodiment shown in FIG. 1 the effective lengths of side 2 is indicated as $l_1$ and in this embodiment the effective length of opposite side 4 is the same. The effective lengths of sides 3 and 5, indicated by $l_2$, are also equal but the length $l_2$ is less than $l_1$ such that the effective lengths define a parallelogram the longer sides of which are indicated by broken lines in the drawing. The diagonals of the parallelogram are indicated by reference numerals 10 and 11 and it has been found satisfactory if the length of the diagonal 10 relative to the diagonal 11 is in the approximate ratio 3:2. In a preferred embodiment diagonal 10 is of a length of 21cm while diagonal 11 has a length of 14cm. It is not essential for the opposed sides 2 and 4, or 3 and 5, to be of equal length. However, it is important for side 2 to be of greater length than one of its adjacent sides 3 or 5, and similarly for side 4 to be of greater length than the remaining side. If desired, a crease line may be formed along one of the diagonals 10 or 11 as this has been found to impart greater rigidity to the constructed body. In FIG. 1 the sides 2 and 4 are shown as having curved edges and the sides 3 and 5 as having straight edges. However, it will be appreciated that this arrangement is not essential and all or some of the sides may have curved or straight edges provided, however, that the effective lengths of the sides define a generally rectilinear figure.

In FIG. 2 is illustrated one arrangement by which the elements A may be assembled to form a hollow body. FIG. 2 shows in full lines the outline of a regular icosahedron, that is a solid having 20 faces each consisting of an equilateral triangle. Assuming that one wishes to obtain a hollow body of this general shape which will appear to be spherical then the elements 1 can be arranged side by side so that the point where three hook members interconnect (in a manner to be described hereinafter) coincides with the mid-point of one of the triangles of the imaginary icosahedron, as shown in FIG. 2. Additional elements A may be added in a similar way until the assembly of the body is completed. In FIG. 3 is shown in full lines the outline of a regular dodecahedron which has 12 faces each consisting of an equilateral pentagon. One way of assembling a body of this general shape, which will also appear to be almost sperical, is to arrange the interconnecting corners of the elements to coincide with the mid-point of each pentagon, other interconnecting points of the elements coinciding with the corners of each pentagon.

In FIG. 4 is shown a hollow body of general octahedron shape formed from 12 interconnected elements A according to the invention. This body is particularly suitable for use as a lampshade and the sheets 1 are of a translucent plastics material. In the formation of the body adjacent elements are arranged with their longitudinal axes substantially normal to each other, that is the longer sides 2 and 4 of each element meet and overlap the shorter sides 3 and 5 of adjacent elements, or vice versa. Because of the fact that the overlapping sides are of different lengths the longer side is flexed outwardly and this imparts a tension in the shorter side which in turn imparts rigidity to the whole body. Because of the outward flex there are a plurality of openings to the interior of the body and this is useful if the body is used as a lamp shade as the openings provide for efficient ventilation of the interior of the lampshade, and so overheating is prevented. It will be noted that each hook member interconnects with a hook member of either two adjacent elements or four adjacent elements. In the case where four hook members interconnect these four hook members should be hook members 7 or 9, i.e. the hook members having in-turned mouths. The in-turned mouths serve to lock the hook members in the interconnected position during the construction of the body. In the assembled body the edges of the sides 2 and 4 appear as curved lines. It will be noted from the drawing that the curve which defines the outer part of each hook member includes an arc of a circle such that when three or more hook members are interconnected their outer edges overlap to form what appears visually to be a full circle. The surface of the hollow body is thus made up of a plurality of curved lines which flow cleanly into each other to provide a design which is pleasing to the eye.

If the body is used as a lampshade a bulb may be inserted therein by removing or partly detaching one of the elements, and the electric cable or flex can be arranged to enter the body through a small aperture at the centre of the connection between three of the hook members. When the detached element is replaced the hook member will grip the flex to support the lampshade in position.

In FIG. 5 is shown a further hollow body, suitable for use as a lampshade, and made up of thirty elements A according to the invention. In this embodiment the elements form a dodecahedron which has a general spherical shape. This body is assembled in much the same way as the body shown in FIG. 4 except that in some instances five of the hook members interconnect. Referring back to FIG. 3 it will be noted that the point where five of the hook members interconnect is, in fact, the centre point of one of the pentagons making up the dodecahedron (this centre point being raised upwardly out of the plane of the pentagon). The points where three hook members interconnect coincide with each of the five corners of the pentagon. Likewise, referring back to FIG. 2 the point where three of the hook members interconnect is the centre point of one of the triangles making up the icosahedron. The points where five hook members interconnect coincide with each of the three corners of the triangle.

FIGS. 6 annd 7 show irregular shaped bodies formed from a plurality of elements. In the body shown in FIG. 6 ten elements A are used to form the body which is an irregular icosahedron having twenty triangular faces, each element forming two of the triangles. Fifteen elements A have been used in the construction of the irregular-shaped body shown in FIG. 7.

FIG. 8 is a diagrammatical illustration showing the way in which twleve elements A of the invention are interconnected to form a octahedron hollow body as shown in FIG. 4. The arrows indicate the sides which are to be interconnected.

FIG. 9 shows a second element B according to the invention, and consists of a sheet 1, of flexible material. The sheet is substantially triangular in shape and has three sides 3, 4 and 5. The side 2 is laterally extended and curved to define hook members 6 and 9, while the side 3 is extended to define the hook member 8. The hooks are positioned at each of the three corners of the sheet. It will be appreciated that element B is obtained by omitting from element A the hook 7 and a portion of the sheet below the diagonal 11. The mouth 8a of the hook 8 faces towards the mouth 9a of hook 9. The mouth 6a of hook 6 and the mouth 8a have their longitudinal axes running substantially parallel to the side 5, whereas the mouth 9a is inset into the main part of the sheet and has its longitudinal axis inclined to the side 5. In this embodiment the effective length $l_3$ is greater than both the effective lengths $l_1$ and $l_2$, and the effective length $l_1$ is greater than the effective length $l_2$. The effective lengths $l_1$, $l_2$ and $l_3$ define a triangle. The elements B may be used on their own, or in combination with elements A, in the construction of hollow bodies. In FIG. 11 is shown a lampshade constructed by interconnecting four elements B. The elements are interconnected in the manner hereinbefore described with reference to element A. Four of the hooks 9 connected together at the apex of the lampshade and an electric cable or flex 12 enters the lampshade through an aperture at the centre of the interconnected hooks. The hooks grip on the cable as described previously. The lampshade shown in FIG. 10 is not wholly enclosed but is open at its lower end.

A third element C is shown in FIG. 11. This element has four sides 13, 14, 15 and 16. The opposite sides 13 and 15 are laterally extended at each end and the extended portions are curved to defined hooks 17, 18, 19 and 20; each of which is located at a respective corner of the sheet. The mouths 17a and 18a of the hooks 17 and 18 face towards each other, while the mouths 19a, 20a of the hooks 19 and 20 also face towards each other. The longitudinal axes of mouths 17a and 20a are substantially parallel to the sides 14 and 16 respectively, while the axis of the mouth 19a is inclined to the side 16. The mouth 13a is set into the main part of the sheet 1 and its longitudinal axis is inclined to the side 4. A line joining the deepest points of each of the four mouths defines an irregular quadrilateral. The effective length, as hereinbefore defined, of the extended side 13, indicated in the drawing by $l_1$, is greater than the effective length $l_2$ of the adjoining unextended side 16. The effective length $l_3$ of the extended side 15 is greater than the effective length $l_4$ of the adjoining side 14. Elements C can be assembled together to form hollow bodies in the manner described with reference to elements A.

FIG. 12 shows three elements C interconnected to form a triangular module, while FIG. 13 shows five elements C interconnected to form a module in the shape of a pentagon. These modules may be used to construct bodies of the general shapes described with reference to FIGS. 2 and 3. For example, 12 of the pentagon modules make up a dodecahedron which appears of general spherical shape, while 20 of the triangular modules make up a icosahedron, which also appears of general spherical shape.

FIGS. 14, 15 and 16 illustrate a lampshade constructed from five elements A and five elements B. The lampshade is open at its lower end and the opening is encircled by the triangular elements B. A hole 21 is cut where the hooks interconnect at the apex of the lampshade and the periphery of the hole is clamped between the screw elements of a bulb holder 22. In this way a very rigid construction is obtained. This arrangement is particularly suitable if the elements A and B are made from metal as there is then no danger of the hooks cutting into the electric cable 12.

It will be appreciated that with the elements of the invention bodies of varying geometrical or irregular shapes may be constructed. In their unassembled state the elements can be packed flat in relatively small boxes which cut down on storage space and transport costs. The elements may be sold in packages of, for example, 12, 20 or 30 together with instructions as to their assembly to form lampshades and the like of varying shapes. In the formation of some shapes a certain degree of ingenuity is required and so the assembly of the elements may provide a very satisfactory intellectual exercise.

When the elements are intended for use in the construction of lampshades or the like they are preferably made from a translucent polyvinylchloride sheeting of approximately 0.35in thickness. However, other materials such as, for example, hard rolled spring aluminium or stiff paper or cardboard, may be used. Indeed a particularly attractive lighting effect may be obtained with lampshades made from aluminium elements, as the light is emitted through the apertures formed by the flexed sides of the elements and is reflected from the outer surfaces of adjoining elements. The elements may also be used, for example, in the construction of large modular shells for exhibition purposes. In the latter case the elements may be made from sheets of hardboard or other pliable material.

It is claimed:

1. An element for use in the construction of hollow shell-like bodies comprising a sheet of flexible material having at least three corners and having two laterally extended portions which are shaped as hooks each defining an open mouth each of which hooks is located at a corner of the sheet with the mouths of the hooks facing towards each other, and a third hook is provided at a third corner of the sheet, and said hooks being the sole means for joining said elements with similar elements.

2. An element for use in the construction of hollow shell-like bodies comprising a sheet of flexible material having at least four sides, two opposite sides being extended at their ends to provide four laterally extended portions which are shaped as hooks each defining an open mouth, wherein one of said extended sides has an effective length as measured between the deepest points of adjacent hook mouths which is greater than the effective length of one adjoining unextended side and the other extended side has an effective length which is greater than the effective length of the other adjoining unextended side, and wherein each of said hooks is located at a corner of the sheet with the mouths of two of said hooks facing towards the mouth of the other two hooks, and each hook being shaped to interlock with two or more of the hooks of similar elements in the construction of a hollow body, said hooks being the sole means for interlocking said elements with other similar elements.

3. A lampshade in the form of a hollow shell-like body constructed from a plurality of interconnected elements each element comprising a sheet of flexible material having at least four sides, two opposite sides being extended at their ends to provide four laterally extended portions which are shaped as hooks, each defining an open mouth, wherein one of said extended sides has an effective length as measured between the deepest points of adjacent hook mouths, which is greater than the effective length of one adjoining unextended side and the other extended side has an effective length which is greater than the effective length of the other adjoining unextended side, and wherein each of said hooks is located at a corner of the sheet with the mouths of two of said hooks facing towards the mouth of the other two hooks, and the elements are connected by interlocking each hook with a hook of two or more adjacent elements to form groups of three or more interlocking hooks, and a longer side of each element is joined to a shorter side of an adjacent element whereby the longer side is flexed outwardly so as to create a tension in the shorter side thereby imparting rigidity to the hollow body.

4. A lampshade as claimed in claim 3, wherein the mouths defined by the hooks are wide enough and deep enough to accommodate an electric cable without affecting the interlocking capability of the hooks, so that a cable can be introduced into the lampshade through an aperture in one group of interlocking hooks, the hooks gripping the cable to support the lampshade.

5. An element according to claim 2, wherein a line joining the deepest parts of the mouths of each of the four hooks defines a parallelogram.

6. An element according to claim 2, wherein the mouths of the two hooks located at diagonally opposite corners of the sheet are arranged with their longitudinal axes substantially parallel to the unextended sides of the sheet, the mouths of the remaining two hooks being set into the main part of the sheet with their longitudinal axes inclined to the unextended sides of the sheet.

7. An element according to claim 2, wherein a crease line is formed along a diagonal joining the deepest parts of the mouths of two diagonally opposite hook members.

8. An element according to claim 2, wherein the length of a diagonal joining the deepest parts of the mouths of two diagonally opposite hooks and the length of a diagonal joining the deepest parts of the mouths of the other two hooks are in the ratio 3 : 2.

* * * * *